United States Patent [19]

Davis

[11] 4,140,036
[45] Feb. 20, 1979

[54] APPARATUS FOR CUTTING PIPE INSULATION

[76] Inventor: William L. Davis, 1166 Tara Blvd., Baton Rouge, La. 70806

[21] Appl. No.: 836,017

[22] Filed: Sep. 23, 1977

Related U.S. Application Data

[63] Continuation-in-part of Ser. No. 713,528, Aug. 11, 1976, Pat. No. 4,059,035, which is a continuation-in-part of Ser. No. 643,903, Dec. 23, 1975, abandoned, which is a continuation-in-part of Ser. No. 512,365, Oct. 4, 1974, abandoned.

[51] Int. Cl.$^2$ .................. B23D 57/00; B26D 3/00; B26D 1/34; B27B 19/00
[52] U.S. Cl. ........................................ 83/861; 83/875; 83/768; 83/662
[58] Field of Search ................. 83/1, 5, 768, 662, 698

[56] References Cited

U.S. PATENT DOCUMENTS

| 3,212,376 | 10/1965 | Berenbak et al. | 83/662 |
| 3,518,906 | 7/1970 | Albektson | 83/1 |

Primary Examiner—Donald R. Schran
Attorney, Agent, or Firm—Roy, Kiesel, Patterson & Abadie

[57] ABSTRACT

An apparatus for making semi-circular pipe insulation segments from a block of foamed glass of like foamed, expanded or cellular plastics or elastomers having reciprocating adjustable cutter members mounted on a reciprocating frame structure, which cutter member travels in an arcuate path through the block placed below the cutter members, the improvement of which comprises a rigid adjustable blade assembly.

3 Claims, 20 Drawing Figures

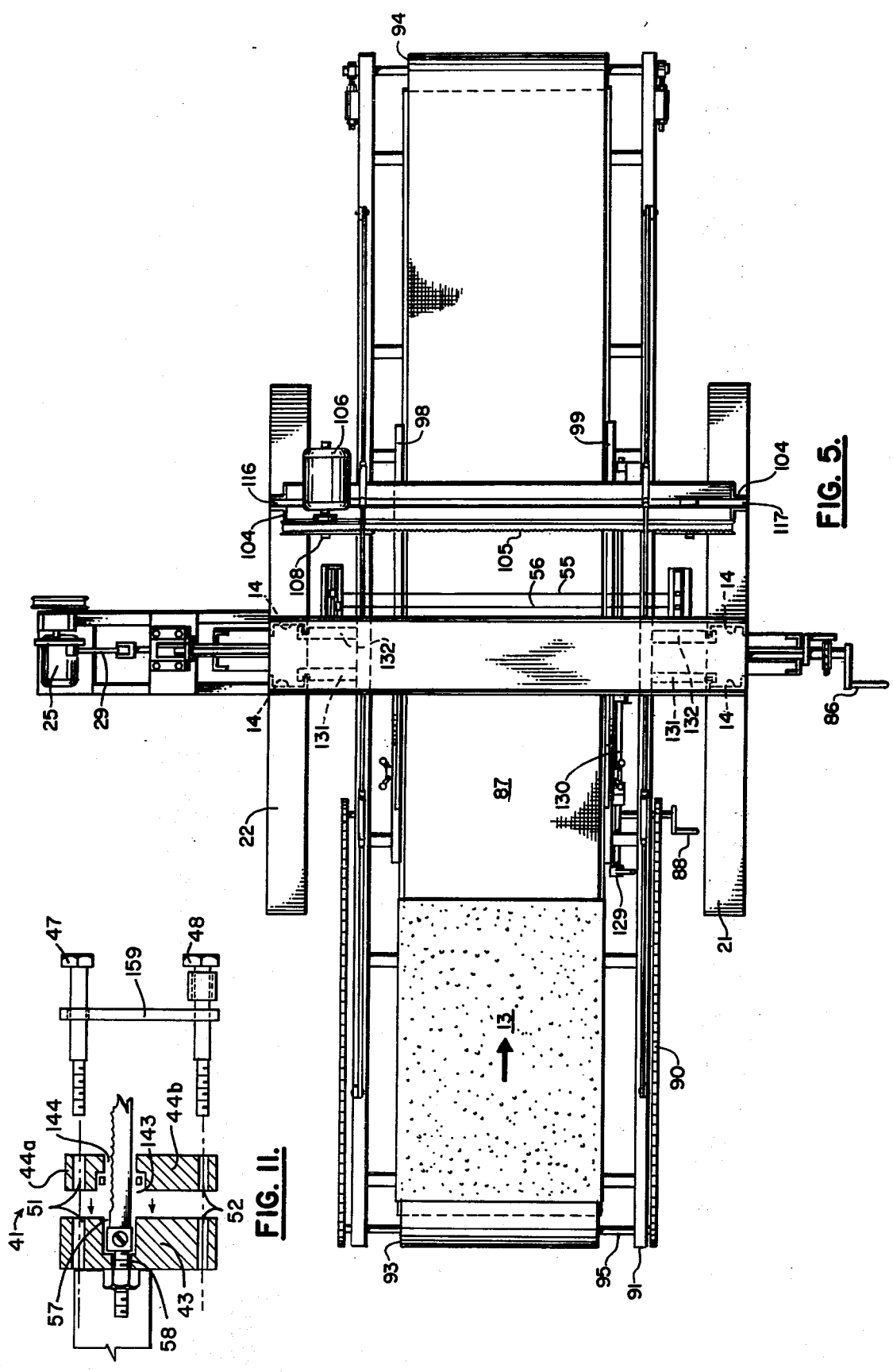

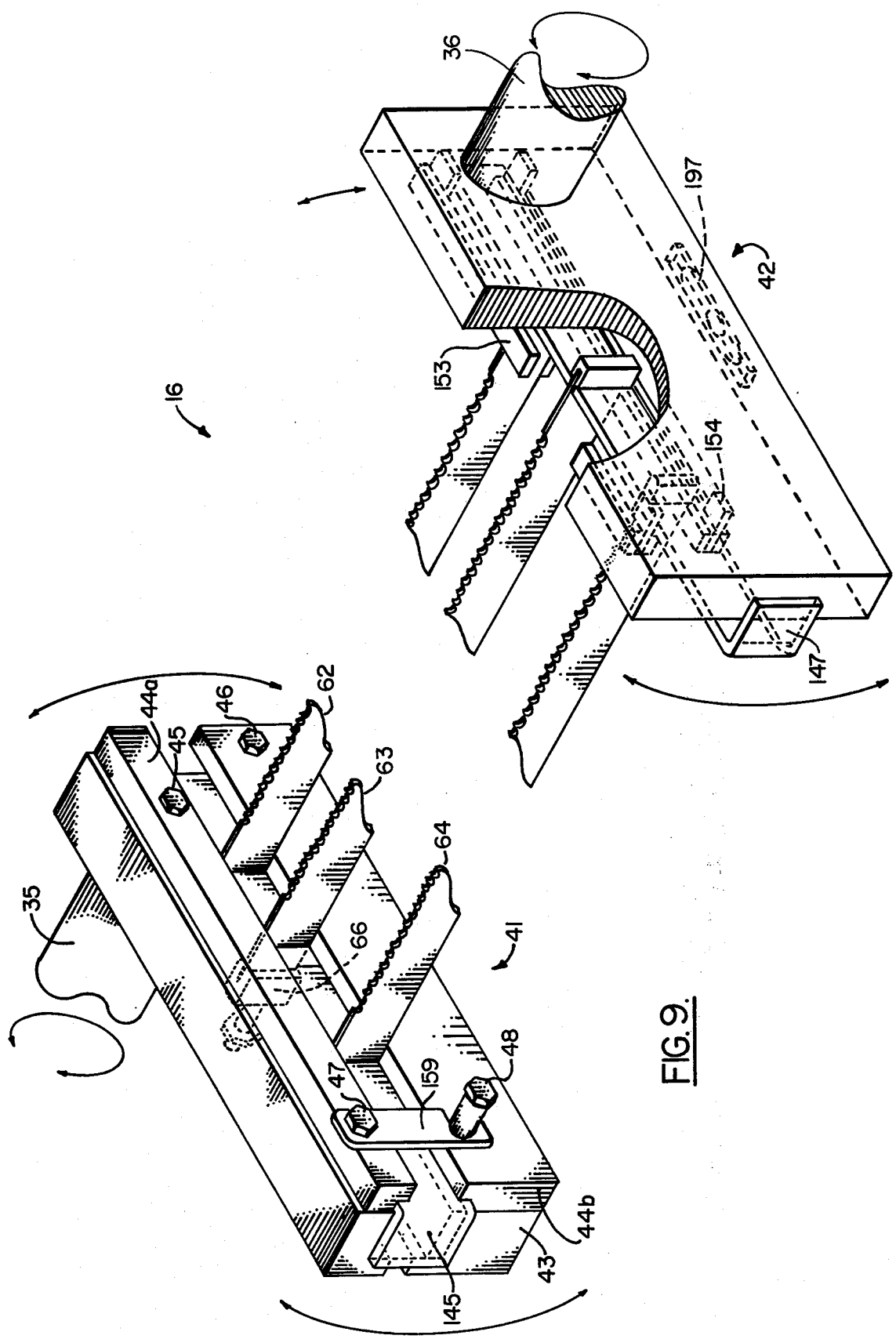

APPARATUS FOR CUTTING PIPE INSULATION

RELATED APPLICATIONS

This is a continuation-in-part of U.S. patent application Ser. No. 713,528, filed Aug. 11, 1976, by the inventor herein and entitled "Apparatus for Cutting Pipe Insulation", now U.S. Pat. No. 4,059,035, which application is a continuation-in-part of U.S. patent application Ser. No. 643,903, entitled "Apparatus for Cutting Pipe Insulation", filed Dec. 23, 1975, now abandoned, by the inventor herein, which application is a continuation-in-part of U.S. patent application Ser. No. 512,365, entitled "Apparatus for Making Insulation Pipe Coverings", filed Oct. 4, 1974, now abandoned. It is intended that for purposes of obtaining benefits of these earlier filing dates that all material and disclosures in those prior applications be made part of this application.

BACKGROUND OF THE INVENTION

1. Field of the Invention

This invention relates broadly to devices for cutting foamed glass or like material and more particularly for cutting semi-circular pipe insulation segments from foamed glass or like material.

2. Prior Art

Conduits adapted to convey thermal material are usually covered with a layer or layers of a proper insulation material so as to avoid as much as possible transfer of heat or cold from the conduit to the surrounding atmosphere. One such type of insulation which, when applied to the exterior of the conduit and held thereon by means of suitable clamp members form a very effective insulation for the conduit. Conduits to be thus insulated come in a variety of outside diameters and thus it is desirable that a means be provided to cut the half sections with varying inside and outside diameters in order to permit for the insulation sections to be of such inside diameter as to snugly engage the conduit to thus provide an effective insulation therefor.

The problems encountered in cutting the insulation material has been the amount of waste material produced, the large amounts of foamed glass dust that is thrown into the atmosphere around the cutting of the necessary semi-circular segments, and the accurate cutting of the inside diameter of the insulation material.

SUMMARY OF THE INVENTION

Therefore, one object of the invention is to provide an apparatus capable of cutting from a block of insulation material, such as foamed glass or the like, half circle segments of the desired inside and outside diameters, which, when applied to a conduit and secured thereto will provide an effective insulation for the conduit.

Another object of the invention is to provide a stationary frame member having mounted therein a reciprocating saw carrying frame with means whereby the same may be reciprocated and simultaneously rotated in an arcuate path of 180° to thus carve out of a block of insulation material a segment or section having the desired inside and outside diameters so that when the segments are applied to the exterior of a conduit they will serve as an effective insulation for the conduit.

Another object of the invention is to provide a simple means whereby the saws employed for cutting the half circle segments may be easily adjusted to thus cut segments of varying thicknesses as well as varying inside and outside diameters for the segments.

Another object of the invention is to provide a power means at one side of a reciprocating saw carrying frame to impart a reciprocating motion thereto.

Another object of the invention is to provide an endless carrier supported on a suitable framework whereby uncut blocks of insulating material may be brought to a position where they will be engaged with the reciprocating and rotating saws to cut the desired half circle segment therefrom and following the cutting operation, the endless carrier will convey the half circle segments to a position where they can be removed from thereon.

Another object of the invention is to provide a simple means whereby the endless conveyor is supported on a horizontally extending frame structure which is supported by means of struts extending therefrom and secured to centrally located vertically extending support columns.

Another object of the invention is to provide an apparatus which will cut from a block of insulating material segments having varying inside and outside diameters with a minimum of waste of the block material and without imparting into the surrounding atmosphere during the cutting operation undesirable dust particles thus avoiding polluting the atmosphere.

Another object of this invention is to provide a cutting blade structure to insure accurate cutting of the foamed glass or like material.

Another object of this invention is to provide a fastening assembly for quick and firm engagement of the block when in position for cutting.

Other objects and advantages of the invention will be readily ascertained by referring to the following description and illustration shown in the drawings.

Accordingly, an apparatus for cutting semi-circular segments of insulation material from a block of insulation material is provided having a stationary vertically extending framework including pairs of spaced apart supports, means for supporting the block in a fixed position between the supports, a reciprocating framework mounted for movement between the pairs of spaced apart supports, a saw assembly mounted for movement with the reciprocating framework, a second means for rotating the saw assembly to cut the semi-circular segments from the block when the framework is reciprocated, wherein the improvement comprises the saw assembly having a blade holding assembly comprising a first saw end support having a first support slot for receiving a first blade carrying means, the first slot having an opening for blades to extend through toward a second saw end support, the second saw end support having a second support slot for receiving a second blade carrying means, the second support slot having a first opening facing the first saw end support for the blades to extend through and a second opening through which extend saw blade tightening means which are attached to one end of the blades fitted into the second support slot.

BRIEF DESCRIPTION OF THE DRAWINGS

FIG. 5 is a top view taken along lines 5—5 of FIG. 1.

FIG. 9 is a perspective view of the saw assembly.

FIGS. 10-13 are perspective cutaways of details of the saw assembly.

PREFERRED EMBODIMENTS OF THE INVENTION

Figure 1:
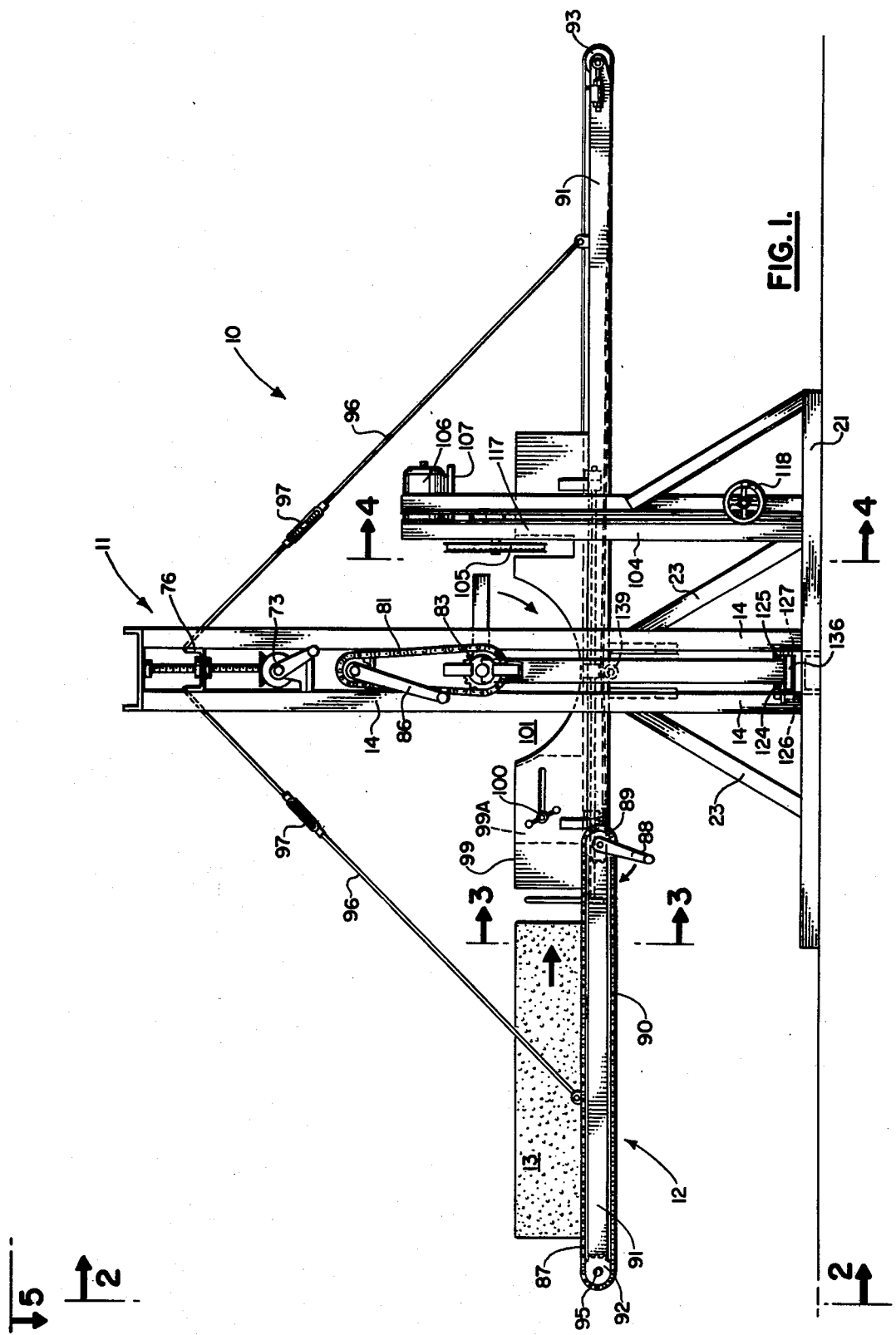
FIG. 1 is a side elevation view showing the block position on the conveyor assembly.

Referring now to the drawings wherein like reference numerals are employed to designate like parts throughout the various views thereof, numeral 10 designates in general the structures of the present invention. Looking in particular at FIGS. 1 and 2, apparatus 10 comprises a stationary vertical extending framework 11, conveyor belt assembly 12 for supporting the block 13 of insulation material in a fixed position between channel iron 14, a reciprocating framework 15 mounted for movement between the pairs of spaced apart channel irons 14, a saw assembly 16 mounted for movement with framework 15, and a second means 17 for rotating the saw assembly to cut semi-circular segments from block 13 when framework 15 is reciprocated.

Vertically extending upright channel irons 18 and 19 extend on each side of the saw assembly 16 and are connected at their lower ends, as by welding or otherwise, to a transversely extending beam or channel iron 20. When using the term "channel iron" in the description of the invention, it will be understood the same comprises generally U-shaped members having a bottom and upstanding walls and such structures are well known in the art.

Uprights 18 and 19 are mounted for reciprocating movement between stationary framework 11 in a manner to be more fully described hereinafter. Stationary framework comprises a pair of spaced apart vertically extending standards 14, one such pair extending on each side of the saw assembly 16, and such standards are secured, as by welding or otherwise, to horizontally extending channel irons 21, 22 which are either ground or floor supported. Extending from the horizontal channel irons 21, 22 are diagnoally disposed braces 23 which are secured, as by welding or otherwise, to both the horizontal irons 21, 22 and to vertical standards 14 to add rigidity to the said standards 14 as shown.

Figure 2:
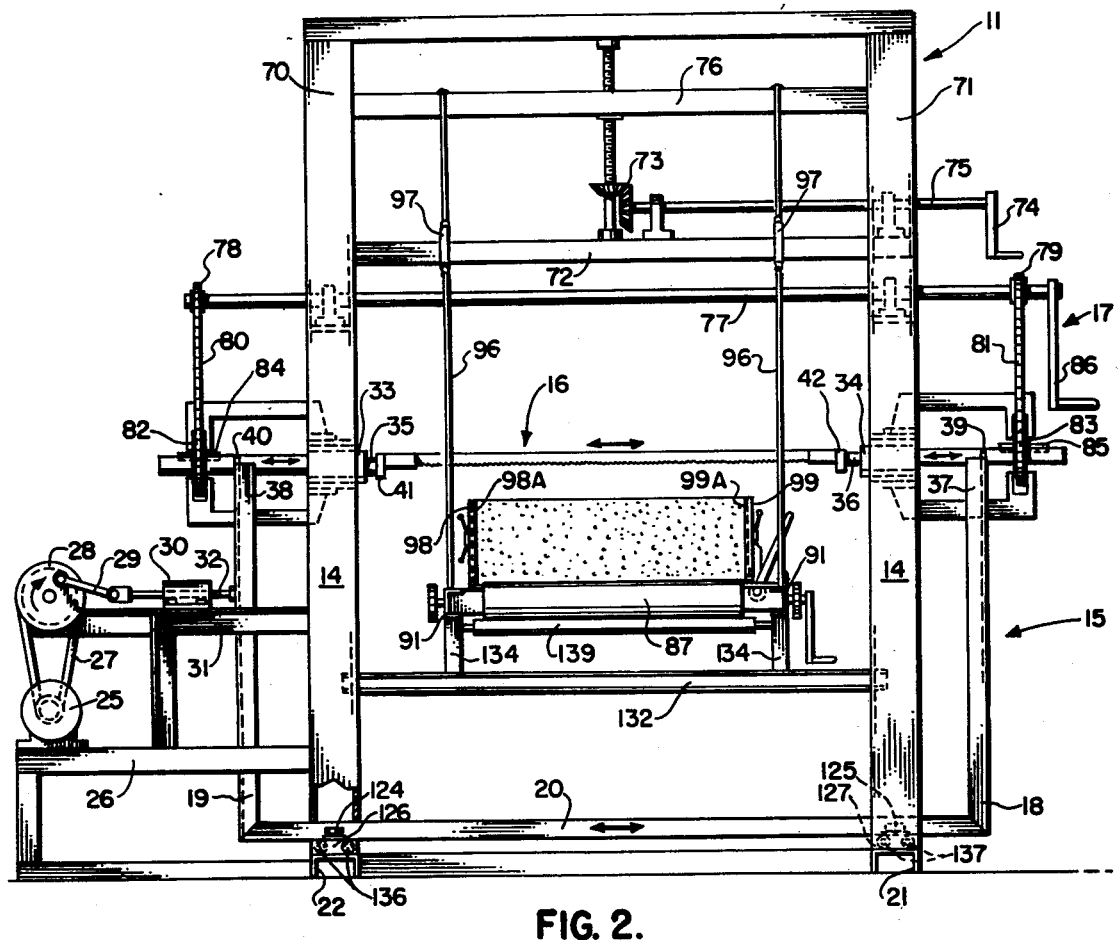
FIG. 2 is an end view taken along lines 2—2 of FIG. 1 showing the saw assembly mounted on the reciprocating framework.
Figure 3:
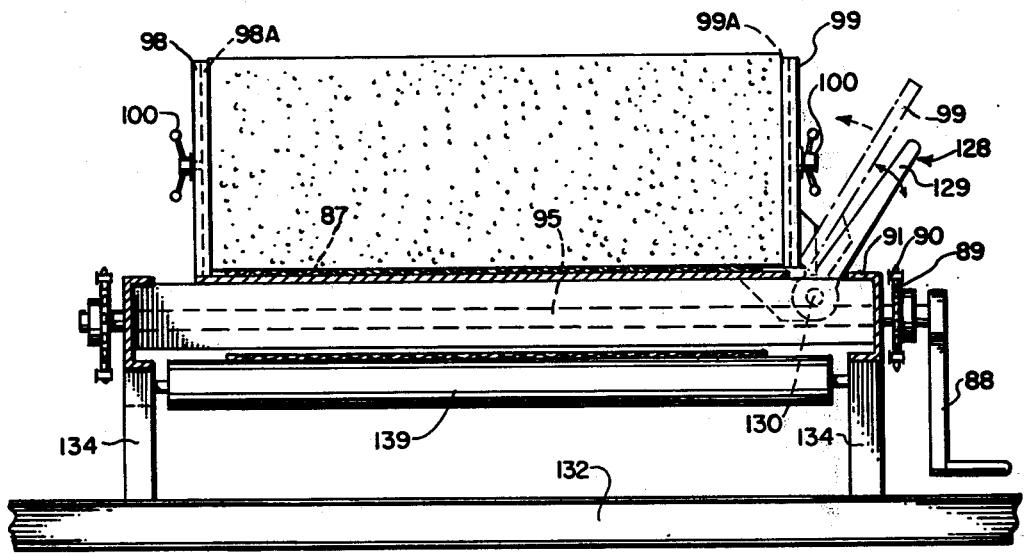
FIG. 3 is another end view taken along lines 3—3 of FIG. 1 showing the racheting assembly for fixedly positioning of the block.
Figure 8:
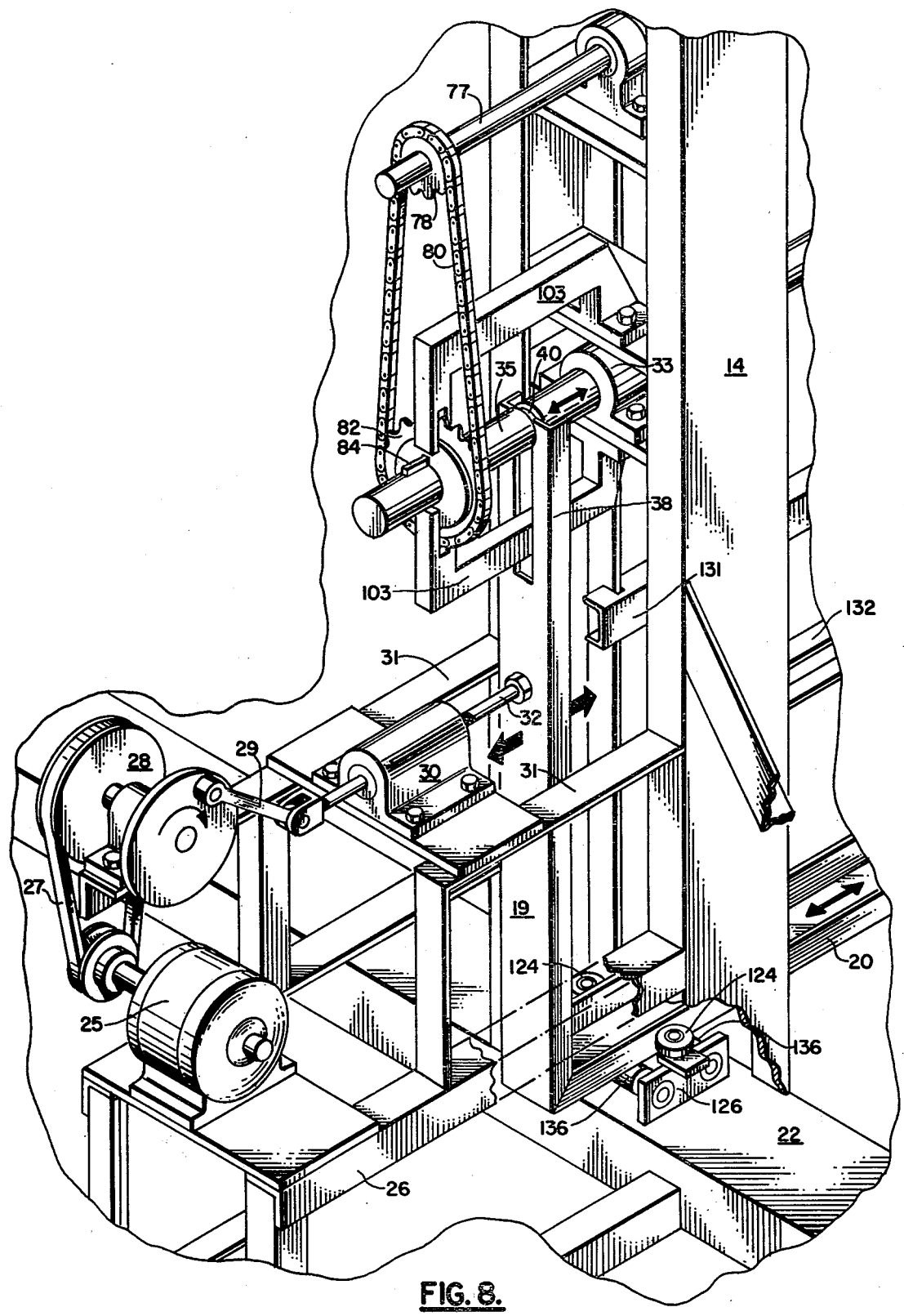
FIG. 8 is a perspective view showing one embodiment of the reciprocating drive means for the reciprocating framework.
Figure 12:
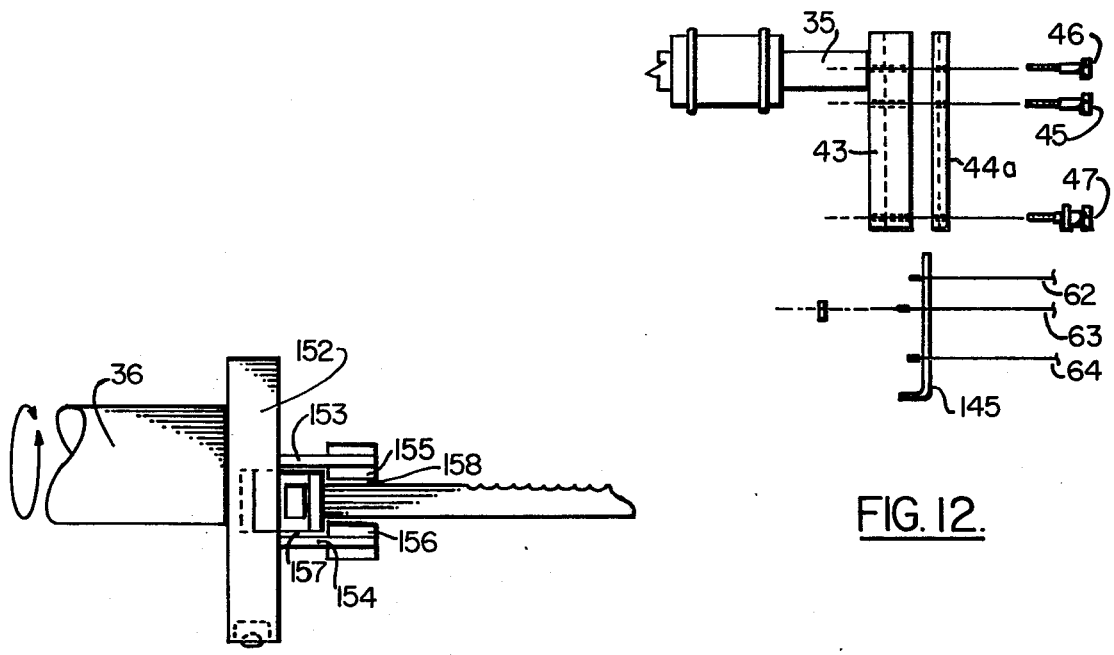
Figure 13:
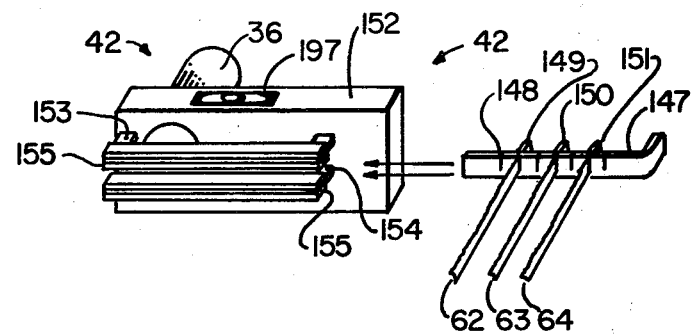

Thus far, there has been described a stationary framework comprising the pairs of spaced apart vertical standards 14, one pair of each side of the apparatus to thus present a rectangular framework. As best seen in FIGS. 2 and 8 of the drawings, the movement framework consisting of uprights 18 and 19 and transverse beam 20 are mounted between the said spaced apart vertical standards 14 and means to be described more fully hereinafter effect a travel of the movable framework as shown by the directional arrows in FIGS. 2 and 8 of the drawings.

To assist and guide the movable framework in its reciprocating path are pairs of rollers 136 and 137 mounted on plate members 126, 127, respectively, which in turn are welded to horizontal channel irons 22, 21, respectively. Channel iron 20 rests on these roller guides 124, 125 attached to plate members 126, 127, respectively, are placed in contact with the sides of channel iron 20 on each side as shown best in FIGS. 2 and 8.

Again examining FIGS. 2 and 8, a suitable motor 25 is mounted on supports 26 which are welded or otherwise secured to each of the uprights 14 and suitable bracing extends therefrom to rigidify the mounting. A belt 27 extends from the conventional pulley on the motor 25 and extends to pulley 28 to which is connected an eccentrically mounted pitman arm 29 which extends through a stationary bearing 30. The pulley 28 and bearing 30 are each supported on horizontally extending support plates 31 secured in any known manner on spaced apart vertical uprights 14. The portion of the arm 29 extending through the bearing 30 is pivotally connected in any known manner to upright 19 by means of a horizontal rod 32. Thus, as can be appreciated, rotation of the pulley 28 will cause the eccentrically mounted pitman arm 29 to effect a reciprocating motion to the aforesaid movable frame structure to which the end of horizontal rod 32 is secured.

Fixedly mounted on each of the spaced apart vertically extending standards 14 are stationary brackets 33, 34, through which extend shafts 35, 36, which are designed to reciprocate therein when the movable frame is reciprocated and to also rotate therein in a manner to be described more fully hereinafter.

Referring now particularly to FIG. 8 of the drawings, uprights 18 and 19 are each provided with extensions 37, 38, which engage with grooves 39, 40 formed in the shafts 36, 35, so that the movable framework is caused to reciprocate in the direction shown by the arrows.

Figure 10:
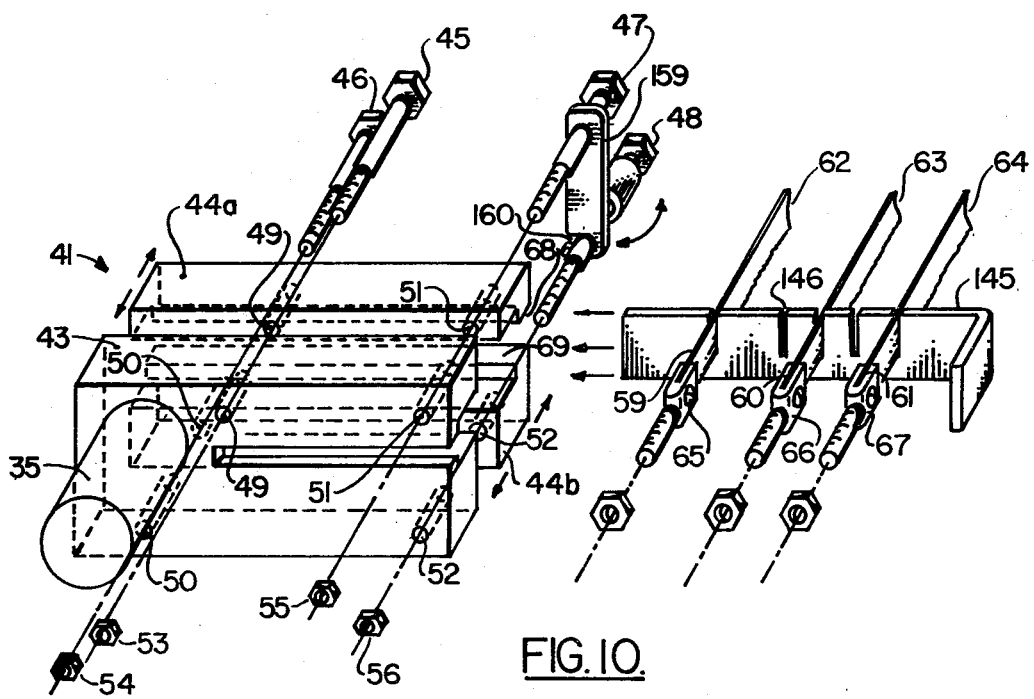

Mounted on and secured off-center to each of the shafts 35, 36 is a blade holding assembly having saw end supports 41, 42. End support 41 is constructed from metal blocks 43, 44a and 44b attached together in secure fashion by bolts 45, 46, 47, 48 and passing through block holes 49, 50, 51, 52, respectively, and secured by bolts 53, 54, 55, 56, respectively, as illustrated in FIG. 10. Block 43 is provided with cavity 57 and slot opening 58 in which blade ends 59, 60, 61 of blades 62, 63, 64, respectively, and blade tightening means 65, 66, 67 mounted on blade ends 59, 60, 61, respectively, can enter and through which blade tightening means 65, 66, 67 can pass. Block 44a is an L-shaped metal bar with its extended shoulder 68 directed downward toward block 44b, which is also provided with shoulder 69 directed upward toward shoulder 68. When blocks 44a and 44b are bolted to block 43, slot 143 is formed having slit 144 through which blades 62, 63, 64 can pass. Bar member 145 having slots 146 into which blades 62, 63, 64 can be placed is shaped to be slid into and out of cavity 143. A second bar member 147 having matching slots 148 to receive the opposite ends 149, 150, 151 of blades 62, 63, 64, respectively.

End block 42 comprises rectangular block 152 having protruding members 153, 154, each with shoulder sections 155, 156, respectively, facing one another to form cavity 157 and slit 158 for receiving second bar member 147 and the blades as shown.

In another preferred feature, bolt securing member 159 is rotatably attached to bolt 47 and having securing slot 160 which fits about bolt 48.

In still another preferred embodiment, level 197 is attached to block 152 in order to more easily align blades 62, 63, 64 for the initial cutting of the insulation block.

Extending upwardly from vertical standards 14 and secured thereto in any known manner are a pair of spaced apart vertical extension beams 70, 71 constructed of suitable channel irons. Welded or otherwise secured to the extension beams 70, 71 is a support plate 72 on which is mounted a jacking mechanism 73 designed to be actuated by a suitable crank 74 keyed to a shaft 75 extending outwardly of the extension beam 71 through suitable bearings. The jack 73 is of conventional construction and is of the usual screw type. A vertically movable channel iron 76 is mounted for vertical travel between the extension beams 70, 71 when the jack is actuated for a purpose to be set forth more particularly hereinafter.

Figure 2A:
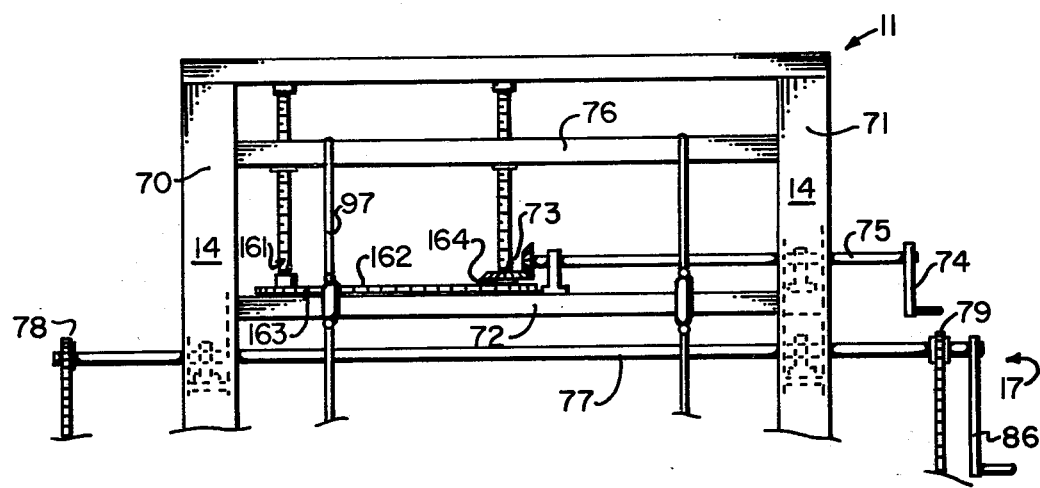
FIG. 2A is an end view similar to FIG. 2 illustrating another embodiment of the invention.

In a preferred feature, as illustrated in FIG. 2A, a second jacking mechanism 161 is mounted on support plate 72 and actuated by chain drive 162 connected to sprockets 163, 164. Through the use of dual jack mechanisms, the level of saw assembly 16 can be more accurately controlled.

Mounted for rotation in suitable bearings (not shown) fixed between the aforesaid extension beams 70, 71 is a shaft 77 having a pair of sprockets 78, 79 fixed thereto at either end thereof. A pair of sprocket chains 80, 81 are trained over the aforesaid sprockets 78, 79 and over sprockets 82, 83 which are each splined as at 84, 85 to the outer ends of shafts 35, 36 as shown more clearly in FIG. 8 of the drawings. A hand crank 86 is keyed to shaft 77 so that upon rotation of the crank 86, shaft 77 and through the sprocket and chain connection, aforesaid, shafts 35, 36 are also caused to rotate.

Figure 7:
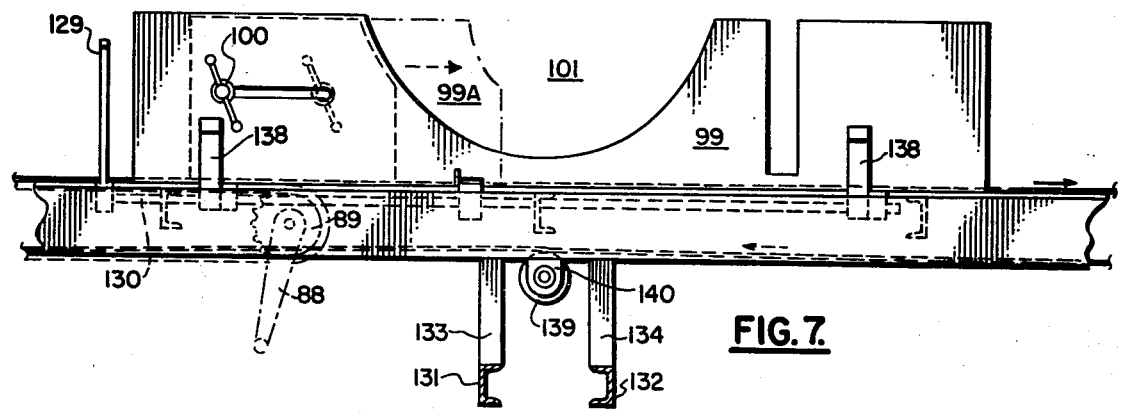
FIG. 7 is a side view taken along lines 7—7 of FIG. 6.

Referring now to FIGS. 1, 5 and 7 of the drawings, a block supporting belt 87 is designed to travel in the direction of the arrows and a hand crank 88 engaging a sprocket 89 causes a rotation thereof. A chain 90 is trained over the sprocket 89 mounted for rotation on the horizontal frame structure 91 and leads to a sprocket 92 mounted for rotation at one end of the horizontal framework 91 of the cutting apparatus. Suitable rollers 93, 94 are mounted for rotation in any known manner in framework 91 and the belt 87 is trained to travel thereover when the hand crank 88 is turned. Of course, a shaft 95 is fixed to and extends through roller 93 and is splined to the aforesaid sprocket 92 for rotation therewith. Another roller 139 mounted on bracket 140 positioned under the cutting area also provides support to belt 87.

Figure 3A:
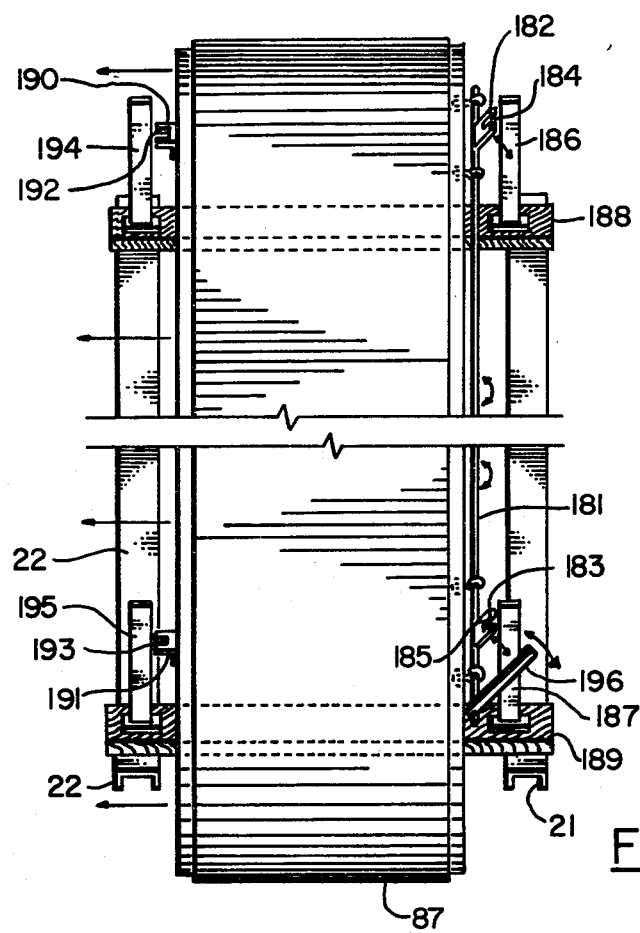
FIG. 3A and FIG. 3B are end views showing an alternate embodiment of the racheting assembly for securing conveyor belt assembly.
Figure 3B:
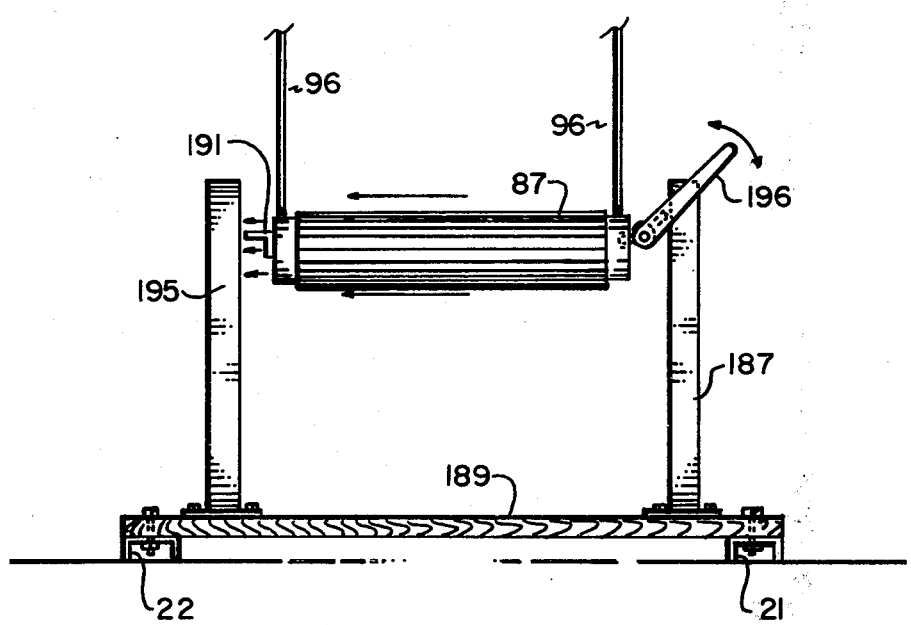

In a preferred embodiment as illustrated in FIGS. 3A and 3B, framework 91 can be locked in secure fashion by a locking assembly comprising rod 181 attached to framework 91 and provided with slotted metal plates 182, 183, whose slots 184, 185, respectively, fit about vertical support members 186, 187 mounted on boards 188, 189 attached to channel irons 21, 22 as shown. In similar fashion, slotted metal plates 190, 191 are attached to the opposite side of framework 91, and whose slots 192, 193, respectively, fit about vertical support members 194, 195, which are also mounted on boards 188, 189. The slotted metal plates 182, 183, 190, 191 are positioned between vertical support members 186, 187, 194, 195 in locking fashion by rotating handle 196 attached to rod 181.

Figure 6:
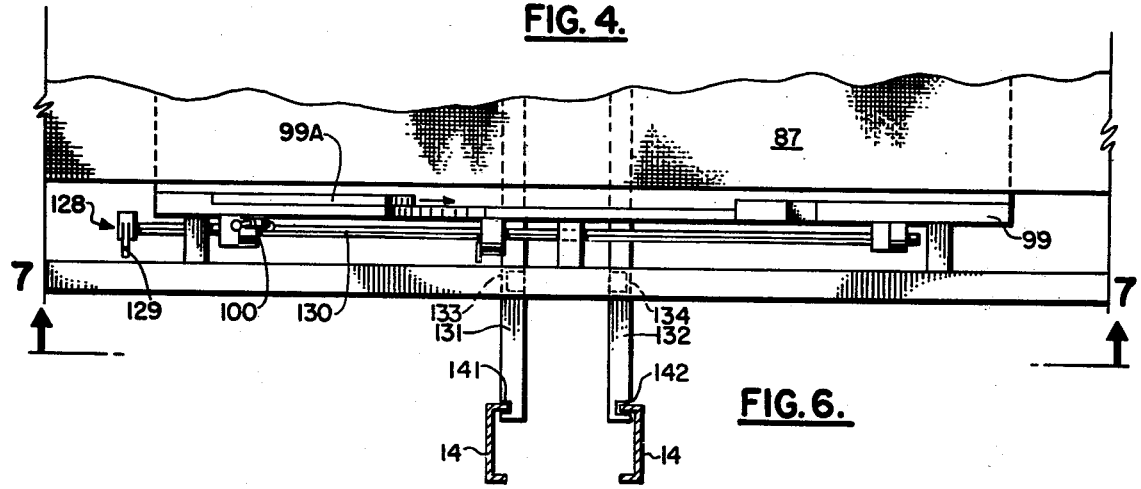
FIG. 6 is a top view showing the racheting assembly.

Referring now more particularly to FIGS. 1 and 2 of the drawings, there is shown therein a pair of steel rods 96, each pair of rods secured to the framework 91 and extending over the vertically movable channel iron 76 for supporting the framework and retain the same in a horizontal position. To level the framework 91, the jack 73 may be actuated to elevate or lower the framework through the aforesaid rods 96 or, if desired, the turnbuckles 97 may be rotated to either shorten or lengthen the rods 96 to either elevate or lower the framework. To maintain framework 91 in horizontal alignment while making vertical adjustments, channel irons 133, 134 (see FIGS. 6 and 7) are welded to framework 91 at one end and to channel irons 131, 132, respectively, at the other end, which extend between and engage vertical upright 14, as shown. Both channel irons 131, 132 are provided with channels 141, 142, respectively, which receive a side plate of upright 14 for vertical travel. Supported in any known manner to one side of the horizontally extending framework 91 is a fixed plate 98 designed to engage with a block of insulation 13 and to retain the same on the belt 87 during the cutting operation. Cooperating with the said fixed plate 98 and mounted for lateral travel across the belt 87 is an adjustable plate 99 both provided with an adjustment screw 100 positioned on each side of the saw carrying mechanism 41 that tightens slideable members 98A and 99A in position. As best seen in FIGS. 1 and 7 of the drawings, each plate 98A and 99A are provided with an arcuate cutout 101 formed therein to thus permit for the saw member to travel through a block of insulation in an arcuate path in the formation of the half circle segments therefrom. Thus, with a block of insulation material 13 to be cut positioned between the fixed plate 98 and the adjustable plate 99 and secured therebetween by tightening of the adjustable plate 99 thereagainst, block 13 will be held steady on belt 87 during the cutting operation.

Thus, it will be seen that there has been described an apparatus which is designed primarily to cut arcuate sections in the nature of half circle segments from a block of insulating material. A means has been provided to effect a reciprocating motion of a movable frame structure having mounted thereon and for movement therewith a saw carrying holders which by virtue of the slots provided therein will permit the saws to be spaced from one another to thus define a cut of a desired thickness through the insulation block. While only two such saws are shown in the drawings, it is obvious as many saws may be mounted in the saw holders as is desired and the same spaced from one another so as to effect a cut of desired thickness of the insulation block shown generally at 13 in FIG. 1 of the drawings.

As stated previously, sprockets 82, 83 are each splined to shafts 35, 36 for rotation therewith. However, in order to prevent lateral movement of the sprockets as the shafts 35, 36 are caused to reciprocate during the cutting operation, arms 102, 103 are secured to the stationary brackets 33, 34 and engage with a suitable fixed cage 103 in which the sprockets 82, 83 are mounted. Thus, during the reciprocation of the shafts 35, 36, the cage 103 will retain the sprockets in alignment with their respective sprockets 78, 79 while still permitting for the shafts 35, 36 to reciprocate as described previously.

Extending over the horizontal framework 91 and supported thereover by means of suitable vertical standards 104 fixed to horizontally extending channel iron 21 is a horizontally disposed saw 105 which is in the nature of an endless band saw driven for rotation by a motor 106 mounted on a suitable bracket 107 affixed in any manner to a movable framework to be decided later.

A suitable driving connection 108 extends from the motor 106 to the band saw carrying wheels 109 over which the saw is trained to travel. The wheels 109 are journalled for rotation on standards 104.

Figure 4A:
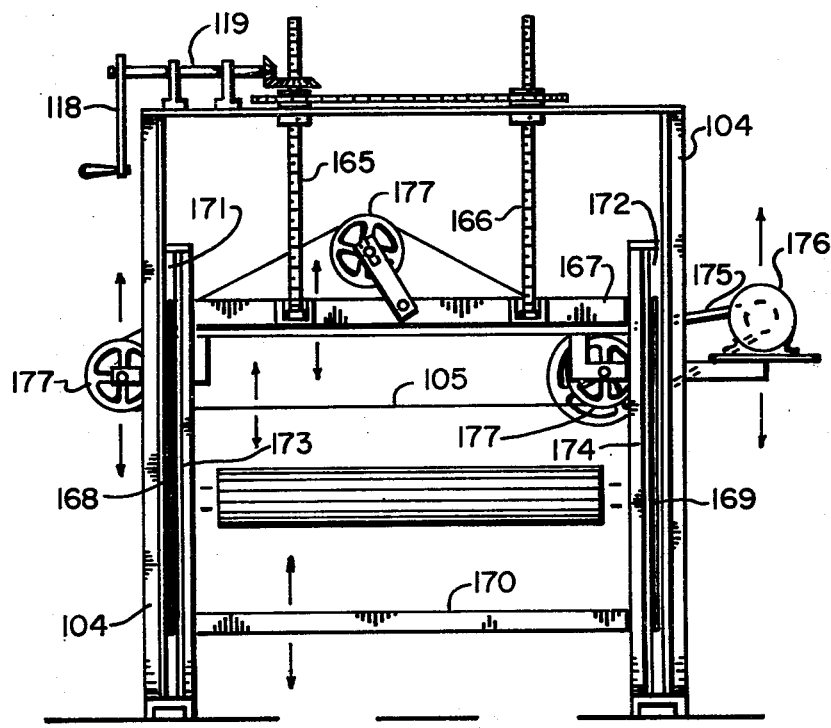
FIG. 4A is an end view illustrating an alternate embodiment of the trimmer saw assembly.
Figure 4:
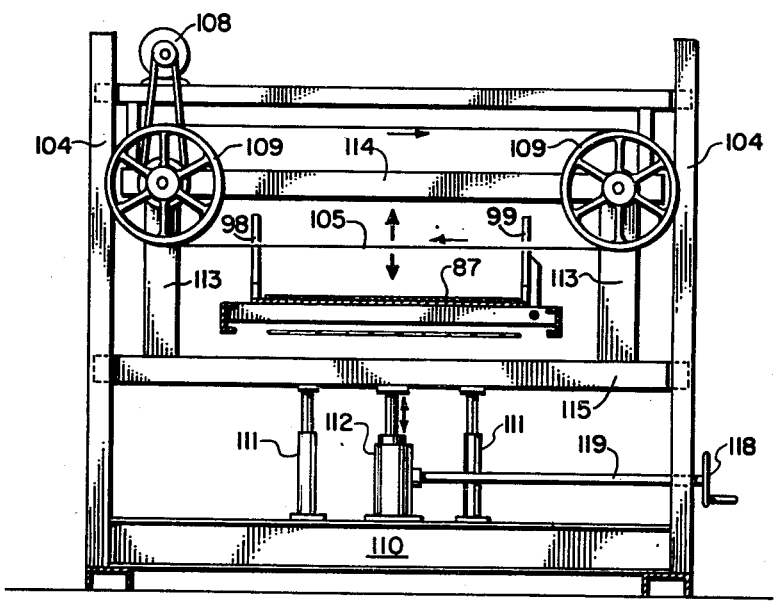
FIG. 4 is an end view taken along lines 4—4 of FIG. 1 showing the trimmer saw assembly.

Referring now to FIG. 4 of the drawings, a fixed channel iron 110 is secured in any known manner to vertical standards 104 and mounted thereon are follower jacks 111 and an elevating jack 112 of known construction. A vertically movable framework comprises a pair of vertically extending spaced apart supports 113, which are secured in any known manner to a horizontally extending support plate 114 and to a horizontally extending support plate 115. Both plates 114 and 115 are provided at their outer ends with vertically extending extension plates 116, 117 adapted for vertical travel between the spaced apart vertical standards 104 as best seen in FIG. 5 of the drawings. A hand crank 118 is keyed to a shaft 119 to thus cause rotation thereof and through the jack 112, elevate or lower the saw carrying frames 113, 114 and 115 to adjust the position of the saw 105 with respect to the block of insulation material 13 on the belt 87 for a purpose to be more fully described hereinafter.

In an alternate and preferred embodiment as illustrated in FIG. 4A, saw blade 105 is placed in the desired cutting position by the use of jacks 165, 166 mounted on angle iron 168 of a vertically moving framework comprising angle iron 167 and a pair of vertically extending members 168, 169 attached at one of their ends to metal bar 170. Vertically extending members 168, 169 are adapted to extend in slots 171, 172, respectively, of guide structures 173, 174, respectively, mounted on vertical standards 104. Also mounted on the vertically moving framework is a suitable driving connection 175 extending from motor 176 to the band saw carrying wheels 177 over which saw blade 105 is trained to travel. A hand crank 178 is keyed to a shaft 179 to cause rotation thereof and through jacks 165, 166 (actuatingly connected by chain 180) to elevate or lower the vertically moving framework.

Operation of the apparatus is as follows:

Having determined the inside diameter of the insulation segment to be cut away from the block of insulating material and also having determined the outside diameter of the segment to be cut, the saw blades in the blade holding assemblies are set apart the required distance to produce the desired diameter and thickness cut and then locked in position in the blade holding assemblies. The block 13 to be cut is shown generally in FIGS. 14, 15 and 16 of the drawings and consists of a generally rectangularly shaped formation of foamed glass or like foamed material indicated generally at 13. The block is supported on the traveling belt 87 and by rotation of the hand crank 88, the block 13 is brought into position beneath the saw assemblies, aforesaid, and clamped into position between adjustable plate 99 and stationary plate 98 for the cutting operation by pulling handle 196 downward to lock plates 182, 183, 190 and 191 between vertical support members 186, 187, 194 and 195, respectively.

With the block in proper position for the cutting operation, the reciprocating framework is caused to reciprocate by virtue of the motive power 25 and linkage 29, 32 extending therebetween. With the reciprocating framework moving back and forth and with the saw assemblies designed to move along therewith, the saws will contact the upper portion of the block and then upon rotation of the hand crank 86, the saw carrying members are caused to travel downwardly into an arcuate path and in its downward travel, a segment of the block will be cut away from the block. Following the downward travel of the saws, the same will now travel in an upward direction, again cutting an arcuate section from the block.

Depending on the spacing of the saws on the saw assemblies, aforesaid, the cut segments will be of known internal diameter to fit outside a pipe of a given external diameter and the thickness of the segment will also have been determined before the cutting operation.

Figure 14:
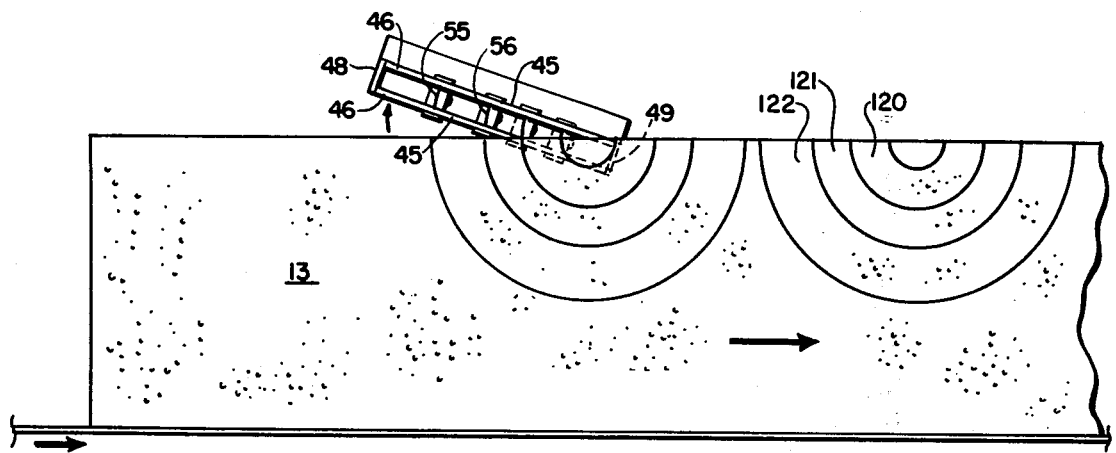
FIGS. 14-16 illustrate the different cutting steps used with this invention.
Figure 15:
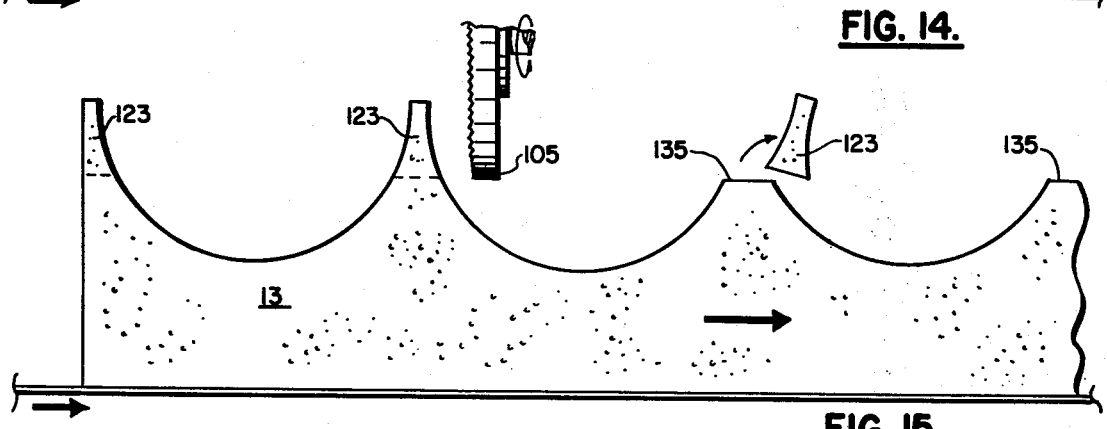
Figure 16:
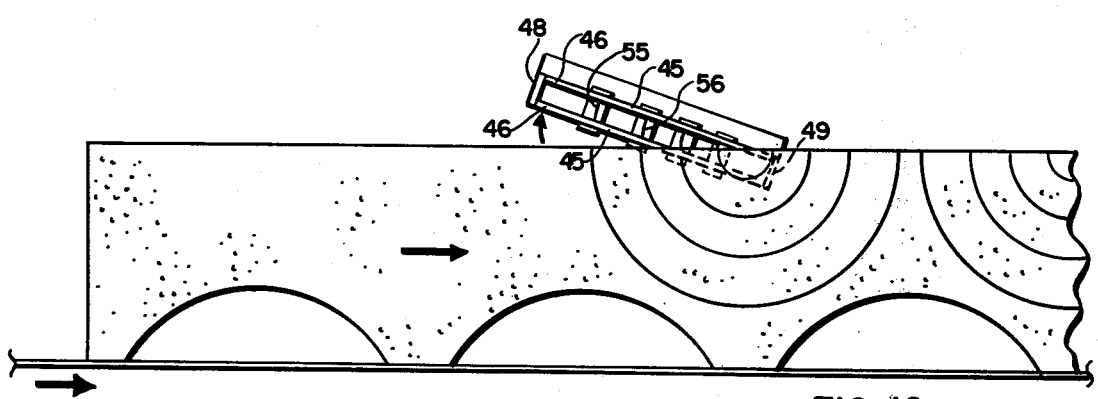

Shown in FIGS. 14, 15 and 16 of the drawings are end views of the block 13 made of foamed glass or like foamed material and such blocks are of rectangular shape and of sufficient thickness to provide half circle segments therefrom when cut by the saws 50 to produce segments adapted to be applied to the exterior of a conduit and when suitably clamped thereon provide a proper insulation for the conduit. It should be pointed out that by following the cutting operation on each block of insulation material, one can produce multiple segments from a one-half portion of the block. Such segments are shown generally at 120, 121 and 122. Following the cutting away of the aforesaid segments, there is formed a peak area 123 extending between the cut portions and in order to provide a supporting surface for the block from which the segments have been removed, the peaks 123 are removed by the horizontally extending saw 105 which will produce flat surfaces 135 which will support the block on the belt for the removal of the segments from the other half portion of the block.

Although I have herein shown and described my invention in what I have conceived to be the most practical and preferred embodiment, it is recognized that departures may be made therefrom within the scope of my invention.

What I claim is:

1. An apparatus for cutting semi-circular segments of insulation material from a block of insulation material having a stationary vertically extending framework including pairs of spaced apart supports, means for supporting the block in a fixed position between the supports, a reciprocating framework mounted for movement between the pairs of spaced apart supports, a saw assembly mounted for movement with the reciprocating framework, a second means for rotating the saw assembly to cut the semi-circular segments from the block when the framework is reciprocated, the improvement of which comprises:

(a) a first saw end support assembly attached to one end of a first rotatable shaft attached to said reciprocating framework, said first saw end support assembly comprising a first block having extending separated shoulder sections attached thereto to form a first cavity into which fits a first blade carrying means and to form a first slit through which saw blades are removably attachable to one end of said first blade, (b) a second saw end support assembly attached to one end of a second rotatable shaft attached to said reciprocating framework, said second saw end support assembly comprising a second block having extending separate second shoulder sections attached theeto to form a second cavity into which fits a second blade carrying means and to form a second slit through which can pass said saw blades which are removably attachable to one end of said second blade carrying means, said second block having a slot extending parallel to said second slit through which one end of said saw blade can extend, and (c) a removable securing means attached to said second shoulder sections to prevent said second blade carrying means from being removed from said second cavity.

2. An apparatus according to claim 1 wherein said first and second blade carrying means comprise a bar member having bar slots in which said saw blades fit.

3. An apparatus according to claim 2 wherein both of said blade carrying means comprise a positioning member attached perpendicularly to said bar member and extends outward a sufficient distance to strike said blocks when said bar members are slid into said cavities.

* * * * *